(12) United States Patent
Rossi

(10) Patent No.: US 7,287,737 B2
(45) Date of Patent: Oct. 30, 2007

(54) DECORATIVE COVER FRAME ASSEMBLY FOR SELECTIVELY CONCEALING A FLAT PANEL OR HIGH DEFINITION TELEVISION DISPLAY

(76) Inventor: Luis Rossi, 71 Williams Ave., San Francisco, CA (US) 94124

( * ) Notice: Subject to any disclaimer, the term of this patent is extended or adjusted under 35 U.S.C. 154(b) by 0 days.

(21) Appl. No.: 11/352,857

(22) Filed: Feb. 13, 2006

(65) Prior Publication Data

US 2006/0150462 A1 Jul. 13, 2006

Related U.S. Application Data

(63) Continuation of application No. 10/783,803, filed on Feb. 20, 2004, now abandoned.

(51) Int. Cl.
*A47F 7/14* (2006.01)
*A47G 1/16* (2006.01)

(52) U.S. Cl. ............... 248/475.1; 248/917; 40/219

(58) Field of Classification Search .......... 248/475.1, 248/476, 489, 917, 918; 40/219, 716, 714, 40/442

See application file for complete search history.

(56) References Cited

U.S. PATENT DOCUMENTS

| | | | | |
|---|---|---|---|---|
| 4,139,955 A | * | 2/1979 | Reiback | 40/427 |
| 4,922,384 A | * | 5/1990 | Torrence | 362/611 |
| 5,264,765 A | * | 11/1993 | Pecorino et al. | 318/265 |
| 5,657,563 A | * | 8/1997 | Lane | 40/219 |
| 6,901,987 B1 | * | 6/2005 | Graham | 160/121.1 |

* cited by examiner

*Primary Examiner*—Amy J. Sterling
(74) *Attorney, Agent, or Firm*—Goldstein Law Offices P.C.

(57) ABSTRACT

A cover frame assembly for use in conjunction with an existing flat panel display of a display device such as a high definition television. The cover frame assembly comprises an outer frame, and a one-way mirror attached within the outer frame. After mounting the flat panel display to a wall, the outer frame is selectively extended over the flat panel display and is supported by the flat panel display. The images projected by the flat panel display upon activation of the display device are easily seen through the one-way mirror. When the display device is deactivated, the reflective surface of the one-way mirror obscures the flat panel display, and the combined frame assembly and flat panel display appear to be a decorative, wall mounted mirror.

5 Claims, 4 Drawing Sheets

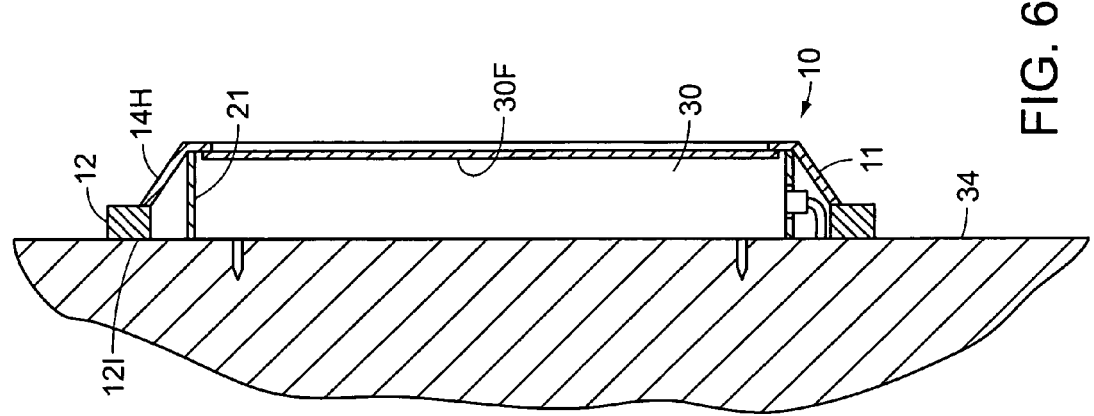
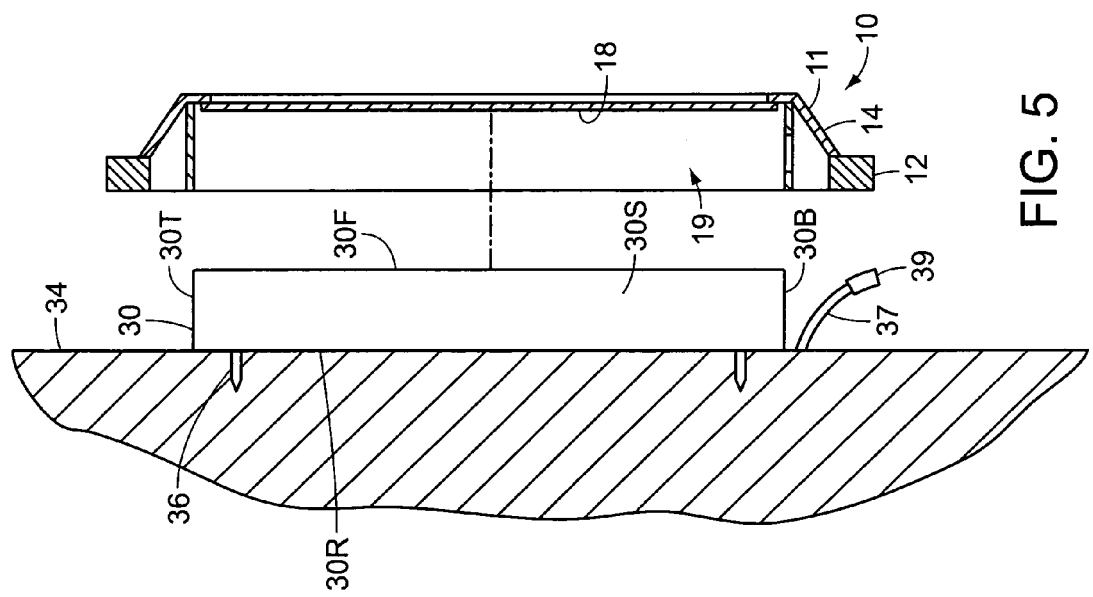

US 7,287,737 B2

DECORATIVE COVER FRAME ASSEMBLY FOR SELECTIVELY CONCEALING A FLAT PANEL OR HIGH DEFINITION TELEVISION DISPLAY

CROSS REFERENCES AND RELATED SUBJECT MATTER

This application is a continuation of patent application Ser. No. 10/783,803, filed in the United States Patent Office on Feb. 20, 2004 now abandoned.

BACKGROUND OF THE INVENTION

1. Field of the Invention

The invention generally relates to a cover frame assembly for mounting onto a flat panel display such as a high definition television, and in particular relates to a frame that covers a flat panel display that is mounted to a vertical surface and has a one-way mirror for selectively obscuring the flat panel display when the display is not activated.

2. Description of the Related Art

Cathode ray tubes have been used for many years in a variety of display devices including television sets. More recently, flat panel displays such as plasma and LCD display panels have been developed. Various mounting frames have been devised for attaching these flat panel displays onto a vertical support structure such as a wall. As unobtrusive as some of these flat panel displays are, these displays and their associated mounting frames may detract from the décor of a room in which they are situated. Moreover, they needlessly detract from the décor of the room when the flat panel display is not being used to display an image produced by the display device. Accordingly, there is a need for a frame assembly for a flat panel display, having a one-way mirror for selectively obscuring the flat panel display when the display is not activated, in order that the frame assembly, and the flat panel display enclosed therein, will appear to be a decorative mirror, and not needlessly detract from the décor of the room in which they are situated.

A variety of mounting frames for display devices have been disclosed. For example, U.S. Pat. No. 6,480,243 to Yamamoto appears to show a mounting frame for a flat panel display, wherein the mounting frame is selectively attached to an opening formed within an existing wall. Additionally, U.S. Pat. No. 5,844,635 to Kim appears to show a mounting frame for a cathode ray tube. Moreover, U.S. Pat. No. 5,657,563 to Lane appears to show a mounting frame for a picture having a one-way mirror and a back-light for illuminating the picture. Furthermore, U.S. Pat. No. 5,943,801 to Wilkson appears to show a mounting frame having a plurality of lights for providing uniform backlighting for a decorative display. Also, U.S. Pat. No. 5,555,654 to Hermann appears to show a mounting frame having lighting to illuminate glass etchings.

It should be noted that these devices, in the spirit of conventional frames, are well suited for mounting a picture to a vertical surface—they are not used for concealing an item already mounted to the vertical surface.

Accordingly, while these devices may be suitable for the particular purpose employed, or for general use, they would not be as suitable for the purposes of the present invention as disclosed hereafter.

SUMMARY OF THE INVENTION

It is an object of the invention to produce a cover frame assembly which may be fitted over an existing flat panel display of a display device such as a television set, in order to frame the flat panel display in an aesthetically pleasing manner. Accordingly, the cover frame assembly is provided with a visually attractive outer frame which borders the flat panel display in an aesthetically pleasing manner.

It is another object of the invention to produce a cover frame assembly which selectively obscures the flat panel display when the flat panel display is not activated. Accordingly, the cover frame assembly has a one-way mirror fitted within the outer frame. When the flat panel display is projecting an image, the image is easily seen through the one-way mirror. However, when the flat panel display is not being utilized to project an image, the darkened flat panel display is obscured by a reflective surface of the one-way mirror, and the combined frame and mirror assembly along with the enclosed flat panel display appear to be merely a decorative mirror.

Further objects of the invention will become apparent in the detailed description of the invention which follows.

The invention is a cover frame assembly for use in conjunction with an existing flat panel display of a display device such as a high definition television. The cover frame assembly comprises an outer frame, and a one-way mirror attached within the outer frame. After mounting the flat panel display to a wall, the outer frame is selectively extended over the flat panel display and is supported by the flat panel display. The images projected by the flat panel display upon activation of the display device are easily seen through the one-way mirror. When the display device is deactivated, the reflective surface of the one-way mirror obscures the flat panel display, and the combined frame assembly and flat panel display appear to be a decorative, wall mounted mirror.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 5 is a vertical cross-sectional view of the cover frame assembly positioned to be extended over a flat panel display which has been rigidly attached to a vertical support structure.

FIG. 6 is a vertical cross-sectional view of the cover frame as in FIG. 5, after it has been extended over the flat panel display.

DETAILED DESCRIPTION OF THE PREFERRED EMBODIMENTS

Figure 1:
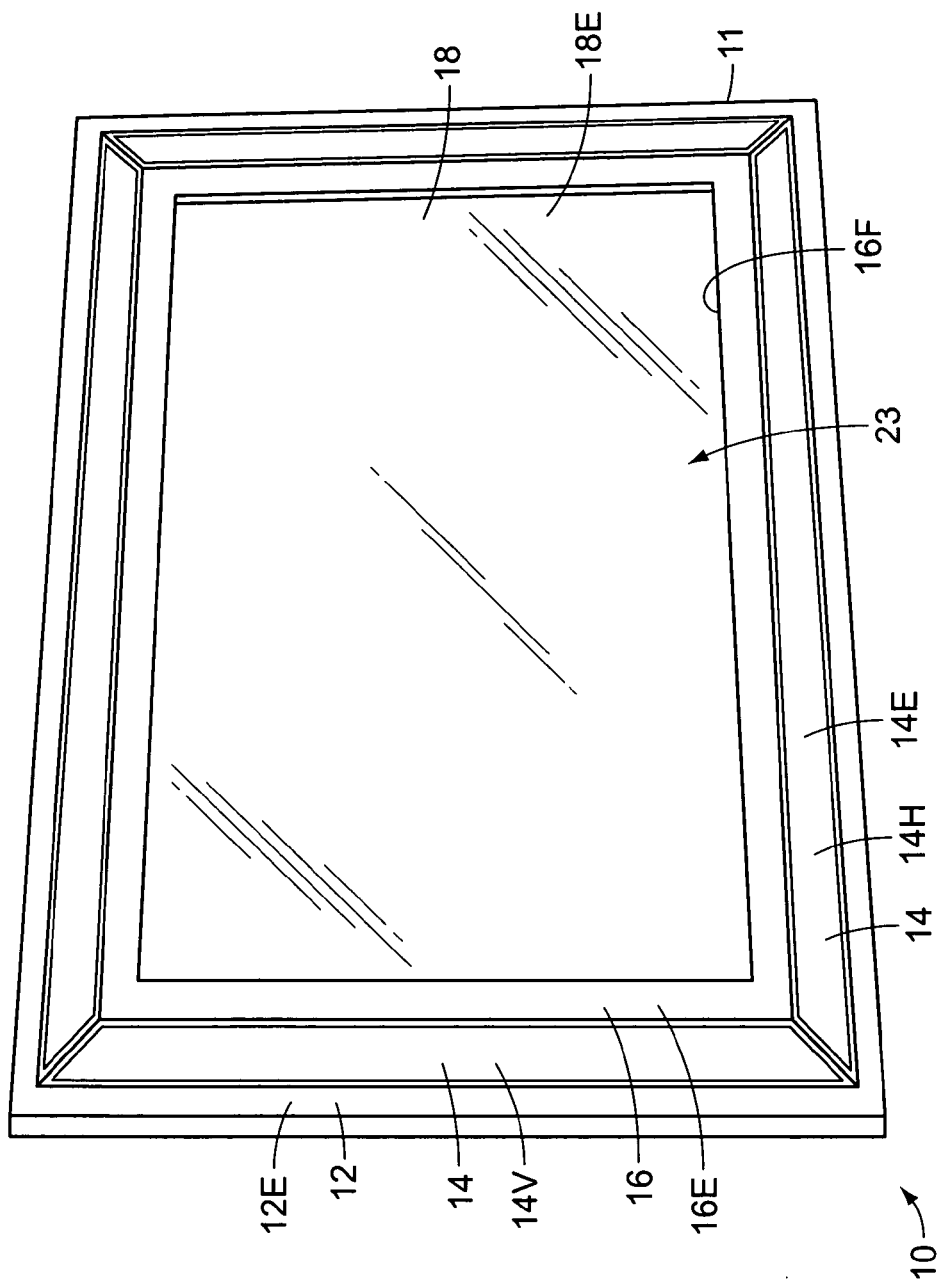
FIG. 1 is a perspective view of a cover frame assembly.

FIG. 1 illustrates a front view of a cover frame assembly 10, for use in conjunction with an existing substantially rectangular flat panel display of a high definition television or other display device. The cover frame assembly 10 is fully supported by the flat panel display and not vice versa.

The cover frame assembly 10 comprises an outer frame 11 and a substantially flat, rectangular one-way mirror 18 attached to the outer frame 11. The one-way mirror 18 has two opposing surfaces, one of which is a reflective surface. After the flat panel display has been rigidly mounted to a vertical support structure such as a wall, the cover frame assembly 10 is fitted over the flat panel display in order to substantially frame the flat panel display within the outer frame 11, and to selectively obscure the flat panel display with the reflective surface of the one-way mirror 18, as will be described. Accordingly, the frame assembly 10 is distinct from other frames in that it is not used to mount a picture or other item to the wall, it attaches over a flat panel display that is already mounted to the wall.

The outer frame 11 has a substantially rectangular, peripherally located wall flange 12, a substantially rectangular mirror flange 16, and four frame walls 14 extending diagonally therebetween. The frame walls 14 include two parallel and uniformly separated vertical frame walls 14V, and two parallel and uniformly separated horizontal frame walls 14V. The mirror flange 16 and wall flange 12 are substantially parallel, and the frame walls 14 extend angularly between the mirror flange 16 and wall flange 12. The frame walls 16 are sized to accommodate the width of the particular flat panel display being used in conjunction with the cover frame assembly 10. The wall flange 12, the mirror flange 14, each of the frame walls 16, and the mirror 18, have outer surfaces 12E, 14E, 16E, and 18E respectively, and inner surfaces 12I, 14I, 16I, and 18I, respectively. After the outer frame 11 has been selectively fitted over the flat panel display, the inner surfaces 12I, 14I, 16I, and 18I face the vertical support structure, and the outer surfaces 12E, 14E, 16E, and 18E face a viewer of the flat panel display. The outer surfaces 12E, 14E, 16E, and 18E are visible in FIG. 1. The mirror flange 16 has edges 16F which define an opening 23 through which the one-way mirror 18 is visible.

Figure 2:
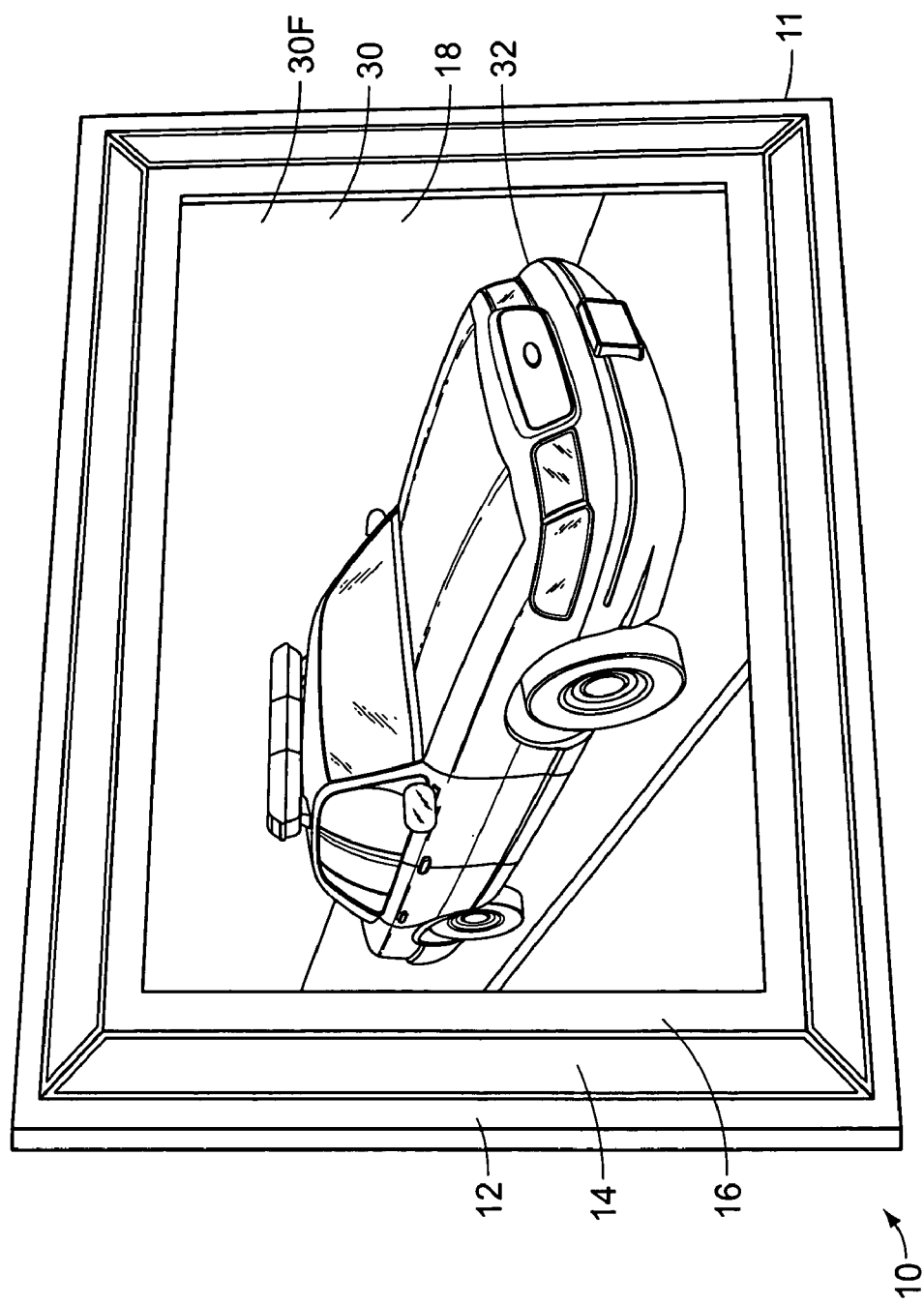
FIG. 2 is a perspective view of the cover frame assembly, as in FIG. 1, after being selectively fitted over an activated flat panel display of a high definition television set.

FIG. 2 illustrates a front view of the cover frame assembly 10, as in FIG. 1, after being fitted over a flat panel display 30 of a high definition television set. The flat panel display 30 has a front surface 30F which faces the viewer. The flat panel display 30 has been activated by the user turning on the television set, thereby producing an image 32 which is projected onto the front surface 30F. Because the image 32 is comprised of light, the image 32 is easily seen through the one-way mirror 18. When the television set is turned off, however, the image 32 is no longer projected onto the one-way mirror 18, and the darkened flat panel display 30 is substantially obscured by the reflective surface of the one-way mirror 18. Accordingly, when the television set is turned off, the cover frame assembly 10, and the flat panel display 30 enclosed therein, appear to be simply a decorative mirror, and will accent the décor of the room.

Figure 3:
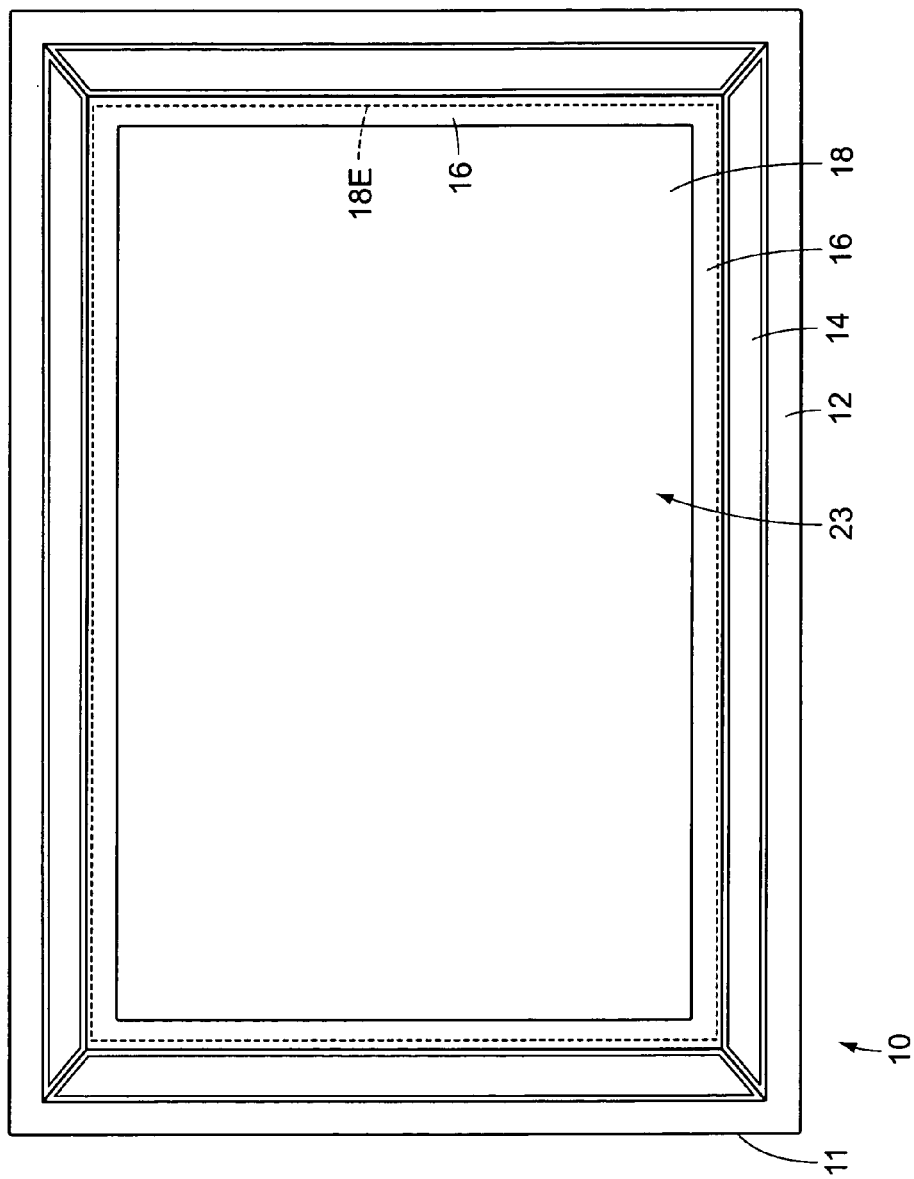
FIG. 3 is a front elevational view of the cover frame assembly, wherein the edges of a one-way mirror are indicated by hatched lines.

FIG. 3 illustrates a front view of the cover frame assembly 10. The one-way mirror 18 has edges 18E, and is attached in proximity to its edges 18E to the inner surface 16I of the mirror flange 16. A variety of attachment methods are contemplated for attaching the mirror 18 to the mirror flange 16, including the provision of mirror mounting brackets and/or the provision of lateral slotted grooves within the horizontal portions of the mirror flange 16, for selective insertion therein of the edges 18E of the mirror 18.

Figure 4:
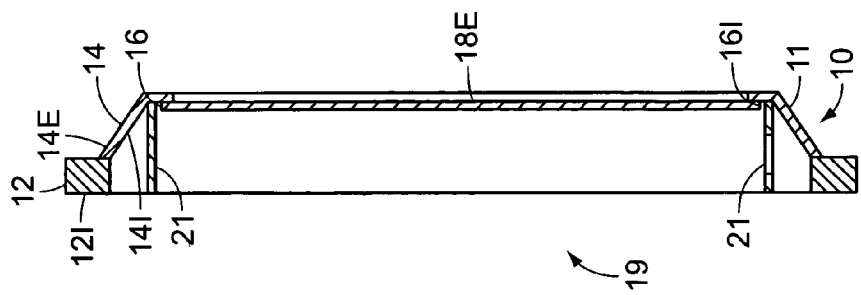
FIG. 4 is a vertical cross-sectional view of the cover frame assembly.

FIG. 4 illustrates a vertical cross-sectional view of the cover frame assembly 10. The cover frame assembly 10 has four bracketing walls 21 extending behind the one-way mirror 18, between the mirror flange 16 and the wall flange 12. The bracketing walls 21 together define a rectangular enclosure 19 for selectively accommodating the flat panel display 30, as will be described. Two of the bracketing walls 21 are visible in FIG. 4.

FIG. 5 illustrates a view wherein the cover frame assembly 10 is positioned to be fitted over a flat panel display 30 having a rear surface 30R which has already been rigidly attached to an existing vertical support structure 34 by the use of threaded screws 36. The flat panel display 30 has an associated electrical cord 37 which terminates in an electrical connector 39. The electrical cord 37 extends from the television set, not shown, and is selectively inserted into the flat panel display 30 in order to power the flat panel display 30. The front surface 30F faces the viewer of the flat panel display 30. The flat panel display 30 additionally has a substantially rectangular housing having a top 30T, a bottom 30B, and two sides 30S, each of which extends between the front surface 30F and the rear surface 30R. The rectangular enclosure 19 defined by the bracketing walls 21 is being extended over the flat panel display 30.

FIG. 6 is a view of the cover frame assembly 10 as in FIG. 5, after being fully extended over the flat panel display 30. The front surface 30F of the flat panel display 30 has peripheral edges which are pressed substantially flush against the inner surface 16I of the mirror flange 16. The inner surface 12I of the wall flange 12 is substantially flush against the vertical support structure 34. The electrical connector 39 of the electrical cord 37 has been inserted into the flat panel display 30 in order to power the flat panel display 30. It is contemplated that the wall flange 12 may additionally be provided with a plurality of openings extending fully therethrough, in order that a threaded screw may be selectively extended into each of the openings and threaded into the vertical support structure 34, in order to secure the outer frame 11 to the vertical support structure 34.

The cover frame assembly 10 is provided in a variety of shapes and sizes in order that it may be used with variously sized flat panel displays 30. The outer frame 11 may be constructed from any number of durable materials, including lightweight metals, plastics, or wood. It is contemplated that the outer frame 11 may be provided with ventilation holes extending fully therethrough, for dissipating the heat produced during operation of the flat panel display 30. Although most of the description of the cover frame assembly 10 is centered upon use in conjunction with a flat panel display 30 of a television set, the cover frame assembly 10 is equally suitable for use in conjunction with the flat panel displays 30 of other display devices.

The one-way mirror 18 is preferably the "Eclipse Advantage" mirror produced by Pilkingston and/or with a ⅛" mirror-grade acrylic coated with a two way mirror finish. Also known as a one way mirror, see through mirror, micropane, 1-way, 2-ways, etc. The color of the mirror is preferably grey. The existing "Eclipse Advantage" mirror is processed in order to increase its reflectivity. In particular, the reflective silver coating on the "Eclipse Advantage" mirror is sprayed with a spray gun containing a silver emulsion, in order to increase the thickness of the reflective layer, and to thereby increase its reflectivity to approximately twice that of the existing "Eclipse Advantage" mirror.

In use, the flat panel display 30 of an existing display device such as a high definition television is mounted to a vertical support structure using any of a variety of standard methods. The cover frame assembly 10 is extended over the flat panel display 30, thereby interposing the one-way mirror 18 between the viewer and the front surface 30F the flat panel display 30, abutting the vertical support surface with the cover frame assembly 10 and thereby substantially enclosing the flat panel display 30 between the cover frame assembly 10 and vertical wall surface, but not attaching the cover frame assembly 10 thereto such that the cover frame assembly 10 is fully supported by the flat panel display 30. Upon selective activation of the display device, the viewer is able to see the image 32 projected upon the front surface 30F of the flat panel display 30 through the reflective surface of the mirror. When the display device has been inactivated, the reflective outer surface of the one-way mirror 18 obscures the flat panel display 30.

In conclusion, herein is presented a cover frame for use in conjunction with an existing flat panel display, having a one-way mirror for selectively obscuring the flat panel display when the display is not activated. The invention is illustrated by example in the drawing figures, and throughout the written description. It should be understood that numerous variations are possible, while adhering to the inventive concept. Such variations are contemplated as being a part of the present invention.

What is claimed is:

1. A method of selectively obscuring an existing flat panel display of a display device by a user, in conjunction with a vertical support structure, said flat panel display having a front surface which faces the user of the flat panel display and a substantially rectangular housing, wherein when the display device is activated, the flat panel display produces an image comprised of light which emanates from the front surface, said method utilizing a cover frame assembly having an outer frame and a one-way mirror having a reflective outer surface, wherein the outer frame includes four bracketing walls defining a rectangular enclosure behind the one-way mirror, said method comprising the steps of:

mounting the flat panel display to the vertical support structure;

concealing the flat panel display and supporting the cover frame assembly by the flat panel display by extending the cover frame assembly over the flat panel display by extending the housing of the flat panel display within the bracketing walls, thereby interposing the one-way mirror between the user and the front surface of the flat panel display;

obscuring the flat panel display with the reflective outer surface of the one-way mirror when the display device is deactivated; and viewing the image projected upon the front surface of the flat panel display through the one-way mirror upon activation of the display device.

2. The method of selectively obscuring a flat panel display as recited in claim 1, wherein the outer frame includes a wall flange and wherein the step of extending the cover frame assembly over the flat panel display further comprises substantially abutting the vertical support structure with the wall flange.

3. A method of selectively obscuring a flat panel display by a user, in conjunction with a vertical support structure, said flat panel display having a front surface which faces the user of the flat panel display, wherein when the display device is activated, the flat panel display produces an image comprised of light which emanates from the front surface, said method utilizing a cover frame assembly having an outer frame and a one-way mirror having a reflective outer surface, said method comprising the steps of:

mounting the flat panel display to the vertical support structure;

concealing the flat panel display by supporting the cover frame assembly with the flat panel display by extending the cover frame assembly over the flat panel display and substantially abutting the vertical support structure, thereby interposing the one-way mirror between the user and the front surface of the flat panel display and substantially enclosing the flat panel display between the cover frame assembly and the vertical support structure without attaching the cover frame assembly to the vertical support structure;

viewing the image projected upon the front surface of the flat panel display through the one-way mirror upon activation of the display device.

4. The method of obscuring a flat panel display as recited in claim 3, further comprising the step of obscuring the flat panel display with the reflective outer surface of the one-way mirror when the display device is deactivated.

5. The method of selectively obscuring a flat panel display as recited in claim 4, wherein the outer frame includes four bracketing walls defining a rectangular enclosure behind the one-way mirror, wherein the flat panel display has a substantially rectangular housing, and wherein the step of extending the cover frame assembly over the flat panel display further comprises extending the housing of the flat panel display within the bracketing walls.

* * * * *